United States Patent
Buck et al.

(10) Patent No.: US 7,343,683 B2
(45) Date of Patent: *Mar. 18, 2008

(54) BATTERY POWERED CIRCULAR SAW

(75) Inventors: John E Buck, Cockeysville, MD (US); James P Bascom, Bel Air, MD (US); Keith Moore, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/328,519

(22) Filed: Jan. 9, 2006

(65) Prior Publication Data

US 2006/0107536 A1   May 25, 2006

Related U.S. Application Data

(63) Continuation of application No. 09/133,923, filed on Aug. 13, 1998, now Pat. No. 6,996,909, which is a continuation-in-part of application No. 09/133,924, filed on Aug. 13, 1998, now Pat. No. 6,057,608.

(51) Int. Cl.
  *B23D 45/16* (2006.01)
(52) U.S. Cl. ............................ 30/388; 30/389; 30/391
(58) Field of Classification Search ............ 30/DIG. 1, 30/375, 377, 388, 391, 390; 310/50, 47, 310/389, 391; 307/147, 150
  See application file for complete search history.

(56) References Cited

U.S. PATENT DOCUMENTS

| 2,962,062 | A |   | 11/1960 | Winkler et al. |
| 3,262,472 | A |   | 7/1966  | McCarty et al. |
| 3,292,673 | A |   | 12/1966 | Gregory |
| 3,447,577 | A |   | 6/1969  | Burrows et al. |
| 3,706,332 | A |   | 12/1972 | George |
| 3,730,239 | A |   | 5/1973  | Kaman et al. |
| 3,757,194 | A |   | 9/1973  | Weber et al. |
| 3,883,789 | A |   | 5/1975  | Achenbach et al. |
| 3,952,239 | A |   | 4/1976  | Owings et al. |
| 3,973,179 | A |   | 8/1976  | Weber et al. |
| 4,084,123 | A | * | 4/1978  | Lineback et al. ........... 320/111 |

(Continued)

FOREIGN PATENT DOCUMENTS

DE    39 19 702    12/1990

(Continued)

OTHER PUBLICATIONS

Makita 1993 Catalog; four pages including cover page, pp. 17 and 19, and back page (dated 1993).

*Primary Examiner*—Boyer D. Ashley
*Assistant Examiner*—Omar Flores Sánchez
(74) *Attorney, Agent, or Firm*—Harness, Dickey & Pierce, P.L.C.

(57) ABSTRACT

A battery powered circular saw includes a rechargeable battery removably attached to the housing and an adjustable shoe pivotally attached to the housing for controlling a depth of cut. A locking mechanism for preventing relative movement between the adjustable shoe and the housing includes a clamp that is located so as to permit the battery pack to be inserted to and removed from a rear end of the housing in a direction that is generally parallel to a plane in which the circular saw blade is disposed.

21 Claims, 5 Drawing Sheets

U.S. PATENT DOCUMENTS

| | | | |
|---|---|---|---|
| 4,221,051 A * | 9/1980 | Glass | 30/377 |
| 4,321,523 A | 3/1982 | Hammel | |
| 4,353,165 A | 10/1982 | Albery | |
| 4,516,324 A | 5/1985 | Heininger, Jr. et al. | |
| 4,555,849 A * | 12/1985 | Ando et al. | 30/388 |
| 4,589,208 A | 5/1986 | Iwasaki et al. | |
| 4,616,169 A * | 10/1986 | Proffitt | 320/111 |
| 4,847,513 A * | 7/1989 | Katz et al. | 307/149 |
| 4,856,394 A | 8/1989 | Clowers | |
| 4,982,501 A | 1/1991 | Sauerwein et al. | |
| 5,010,651 A | 4/1991 | Techter et al. | |
| 5,140,249 A | 8/1992 | Linder et al. | |
| 5,381,602 A | 1/1995 | Matzo et al. | |
| 5,391,972 A * | 2/1995 | Gardner et al. | 320/115 |
| D363,656 S | 10/1995 | Gierke | |
| 5,454,167 A | 10/1995 | Albery | |
| 5,504,412 A | 4/1996 | Chan et al. | |
| 5,508,123 A | 4/1996 | Fan | |
| 5,517,763 A | 5/1996 | Schilling et al. | |
| 5,553,675 A * | 9/1996 | Pitzen et al. | 173/217 |
| 5,589,288 A | 12/1996 | Coulson et al. | |
| 5,671,815 A | 9/1997 | Kabatnik et al. | |
| 5,699,705 A * | 12/1997 | Sibbet | 83/13 |
| 5,792,573 A | 8/1998 | Pitzen et al. | |
| 5,881,823 A * | 3/1999 | Kabatnik et al. | 173/217 |
| 6,075,341 A | 6/2000 | White et al. | |
| 6,308,424 B1 * | 10/2001 | Stielper | 30/391 |
| 6,775,913 B2 | 8/2004 | Fey et al. | |

FOREIGN PATENT DOCUMENTS

| | | |
|---|---|---|
| DE | G 91 15 492.8 | 4/1992 |
| DE | 93 11 901.1 | 12/1992 |
| DE | 93 19 361.0 | 2/1994 |
| DE | 44 03 189 | 8/1995 |
| DE | 196 04 346 A1 | 8/1996 |
| DE | 34 29 095 | 1/1997 |
| DE | 295 13 330 | 2/1997 |
| EP | 0 238 718 | 9/1987 |
| EP | 0 374 600 B1 | 8/1995 |
| EP | 1 017 149 A2 | 7/2000 |
| EP | 1 025 961 A1 | 8/2000 |
| GB | 2 302 051 | 1/1997 |
| JP | 59-140001 | 8/1984 |
| JP | 7-52067 | 2/1995 |
| JP | 9-164501 | 6/1997 |
| WO | WO 98 55723 | 6/1998 |

* cited by examiner

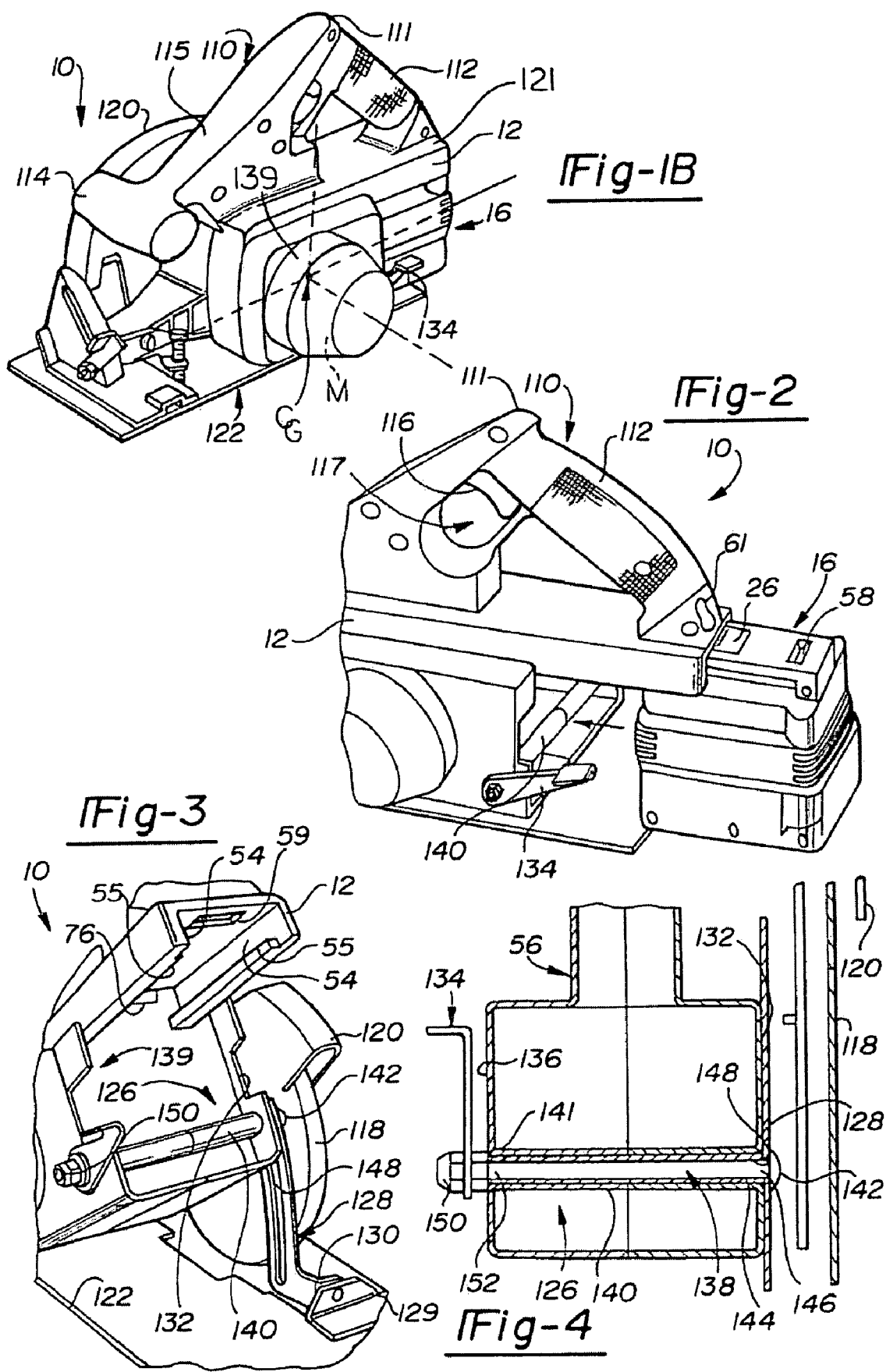

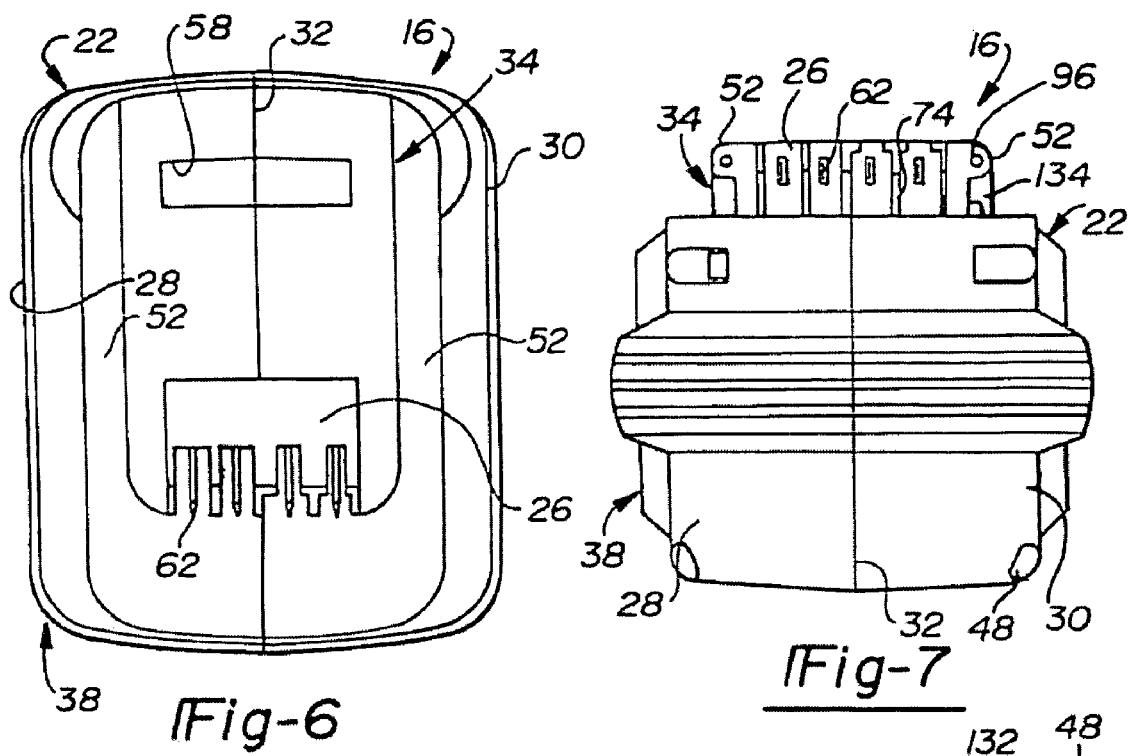
Fig-6
Fig-7
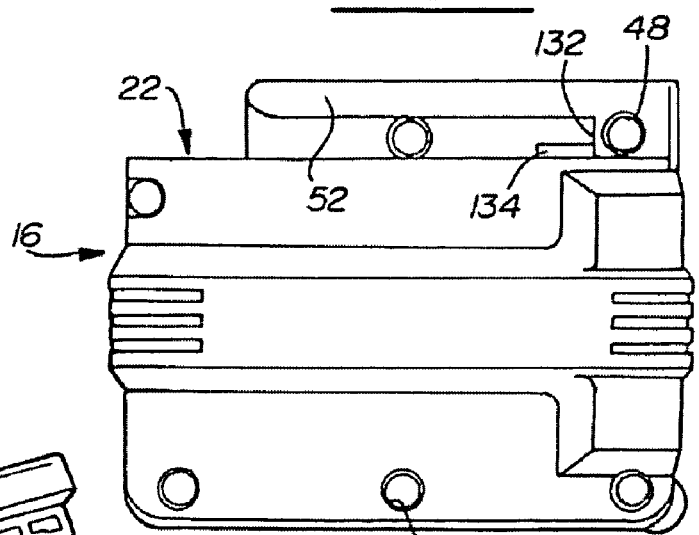
Fig-8
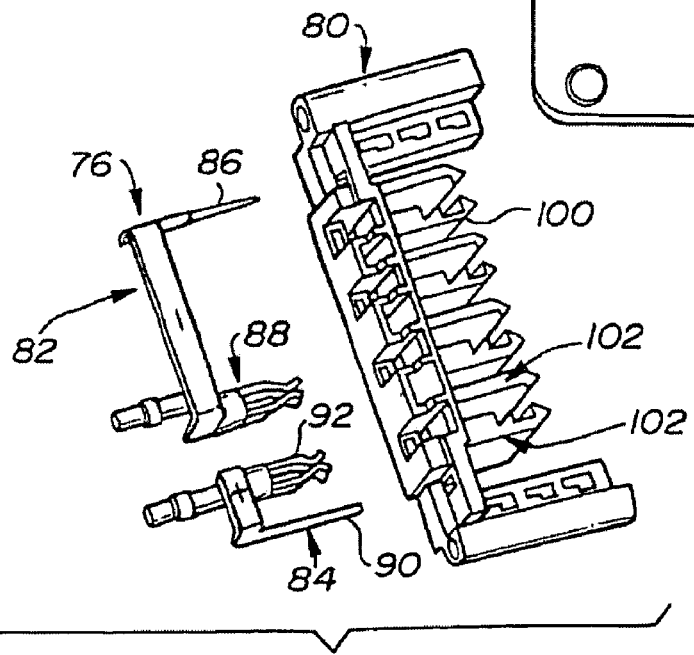
Fig-9

BATTERY POWERED CIRCULAR SAW

CROSS-REFERENCE TO RELATED APPLICATIONS

The present application is a continuation of U.S. patent application Ser. No. 09/133,923 filed Aug. 13, 1998 now U.S. Pat. No. 6,996,909 entitled "Battery Powered Circular Saw", which is a continuation-in-part of U.S. patent application Ser. No. 09/133,924 filed Aug. 13, 1998 entitled "Cordless Power Tool System", which issued as U.S. Pat. No. 6,057,608 on May 2, 2000. The disclosures of U.S. patent application Ser. No. 09/133,923 and U.S. patent application Ser. No. 09/133,924 are hereby incorporated by reference as if fully set forth in their entirety herein.

FIELD

The present disclosure generally pertains to power tools and more particularly to a battery powered circular saw.

BACKGROUND

It is now well known to power various tools with rechargeable batteries. For example, commonly assigned U.S. Pat. No. 3,757,194 discloses a cordless power tool having a removable battery pack. In the embodiment illustrated, the cordless power tool is a shrub and hedge trimmer powered by a battery pack removably attached to a motor housing. Advantageously over corded tools, such battery powered tools are not limited to use where a power cord can reach an electrical outlet. Moreover, such battery powered tools do not have cords which may inconvenience tool operation or which may be inadvertently severed during tool use.

To a more limited extent, it has been heretofore proposed to power a circular saw with a rechargeable battery. For example, U.S. Pat. No. 4,555,849 discloses a portable electric circular saw which operates on a rechargeable battery. The disclosed tool includes a rechargeable battery removably insertable into a laterally extending battery chamber. U.S. Pat. No. 4,955,849 fails to disclose any mechanism for locking the base relative to the housing at a desired depth of cut.

While prior efforts to power a circular saw with a removable battery may have attained limited success, they have all been associated with disadvantages. For example, packaging restrictions are significant due to the size of rechargeable batteries required for powering a circular saw. In this regard, incorporation of commercially desirable features such as a readily accessible locking mechanism for locking an adjustable base or shoe relative to a housing for establishing a desired depth of cut has been curtailed in prior known arrangements. Many circular saws have a depth of cut lever located at the rear of the saw, directly adjacent to the blade guard, between the guard and the handle in the top view. Easy access to this area when releasing or locking the lever can be difficult. Some corded saws have moved this control to a more convenient location at the left rear side of the saw so that it is between the user and the saw's handle. On known cordless circular saws, the location of the battery restricts access and ability to use this area.

It is also desirable to further ergonomically improve battery powered circular saws.

SUMMARY

In one form, the present teachings provide a circular saw with a housing, a circular saw blade, a handle, a battery pack and a shoe assembly. The housing has a motor housing portion and a battery connection portion that extends rearwardly from the motor housing portion. The circular saw blade is coupled to the housing and is rotatable about a rotational axis. The handle has a first end, which is coupled to the motor housing portion, and a second end that is coupled to the battery connection portion. The battery pack is removably coupled to the battery connection portion of the housing and is insertable into and removable from the battery connection portion along a line that is contained in a plane that is generally parallel to the circular saw blade. The shoe assembly is coupled to the housing and has a shoe and an adjustment mechanism for selectively adjusting a position of the shoe relative to the housing. The adjustment mechanism includes a depth-of-cut member, which is coupled to the shoe, and a clamp that is coupled to the housing. The clamp is selectively operable for securing the depth-of-cut member to the housing to thereby inhibit movement of the depth-of-cut member relative to the housing. The clamp is mounted to the housing at a location forwardly of the battery pack when the battery pack is positioned in a fully inserted position in which the battery pack is fixedly but removably coupled to the battery connection portion.

In another form, the present teachings provide a circular saw that includes a housing, a guard that is coupled to the housing, a circular saw blade, a handle, a battery pack, a pair of grooves, a pair of rails, a shoe and an adjustment mechanism. The circular saw blade, which is rotatable about a rotational axis, is associated with the housing and is laterally positioned within the guard. The handle has a generally V-shaped portion that is coupled to the housing. The generally V-shaped portion of the handle is disposed generally transverse to the rotational axis and has a first end, a second end that is positioned rearward of the first end, and an apex that is disposed above the housing between the first and second ends. The battery pack is fixedly but releasably engaged to the housing. The grooves are formed on one of the battery pack and the housing. The rails are formed on the other one of the battery pack and the housing and are configured to cooperate with the grooves to align the battery pack to the housing. The adjustment mechanism has a first bracket, which is fixedly coupled to the shoe, a depth-of-cut member, which is pivotally coupled to the first bracket, and a clamp. The clamp includes a first threaded member, which extends through the housing and is movably coupled to the depth-of-cut member, and a second threaded member that is threadably engaged to the first threaded member and configured to translate the first threaded member to selectively secure the depth-of-cut member to the housing. The first threaded member is disposed between the rotational axis and an aft end of the battery pack when the battery pack is fixedly but releasably engaged to the housing. The second threaded member is disposed on a side of the housing opposite the circular saw blade.

In still another form, the present teachings provide a circular saw that includes a housing, a circular saw blade, a handle, a battery pack, a pair of grooves, a pair of rails, a shoe and an adjustment assembly. The circular saw blade is associated with the housing and rotatable about a rotational axis. The handle has a generally V-shaped portion that is coupled to the housing and disposed generally transverse to the rotational axis. The generally V-shaped portion includes a first end, a second end, which is positioned rearward of the first end, and an apex that is disposed above the housing between the first and second ends. The battery pack is fixedly but releasably engaged to the housing. The pair of grooves are formed on one of the battery pack and the housing. The pair of rails are formed on the other one of the battery pack and the housing and are configured to cooperate with the grooves to align the battery pack to the housing such that a center of the battery pack is laterally aligned to a center of the generally V-shaped portion. The adjustment mechanism has a first bracket, which is fixedly coupled to the shoe, a depth-of-cut member, which has an arcuate groove formed therein and is pivotally coupled to the first bracket, and a clamp that includes a first threaded member and a second threaded member. The first threaded member extends through the housing and has a non-circular portion that is disposed in the arcuate groove of the depth-of-cut member. The second threaded member is threadably engaged to the first threaded member and configured to translate the first threaded member relative to the housing to selectively secure the depth-of-cut member to the housing. The first threaded member is disposed between the rotational axis and an aft end of the battery pack when the battery pack is fixedly but releasably engaged to the housing and the second threaded member is disposed on a side of the housing opposite the circular saw blade. The center of gravity of the circular saw including the battery pack is located in-line with a center of the generally V-shaped portion. A trigger is mounted in an apex of the generally V-shaped portion. The center of gravity is disposed in-line with the trigger in a direction that is perpendicular to both the rotational axis and a direction in which the battery pack is releasably engaged to the housing.

Additional benefits and advantages of the present disclosure will become apparent to those skilled in the art to which this disclosure relates from a reading of the subsequent description of the preferred embodiment and the appended claims, taken in conjunction with the accompanying drawings.

DRAWINGS

The drawings described herein are for illustration purposes only and are not intended to limit the scope of the present disclosure in any way.

FIG. 1B is a front perspective view of the battery powered circular saw of FIG. 1A.

FIG. 2 is a rear perspective view of a portion of the battery powered circular saw of the present disclosure shown as a rechargeable battery pack is being installed.

FIG. 3 is rear perspective view of a portion of the battery powered circular saw of the present disclosure shown with an adjustable shoe rotated to an extended position.

FIG. 4 is a vertical cross-sectional view taken through a depth of cut locking mechanism.

FIG. 6 is a top view of the rechargeable battery pack.

FIG. 7 is a front view of the rechargeable battery pack.

FIG. 8 is a left side view of the rechargeable battery pack.

FIG. 9 is an enlarged and exploded perspective view of a tool terminal block carried by the battery powered circular saw of FIG. 1A.

DETAILED DESCRIPTION

Figure 1A:
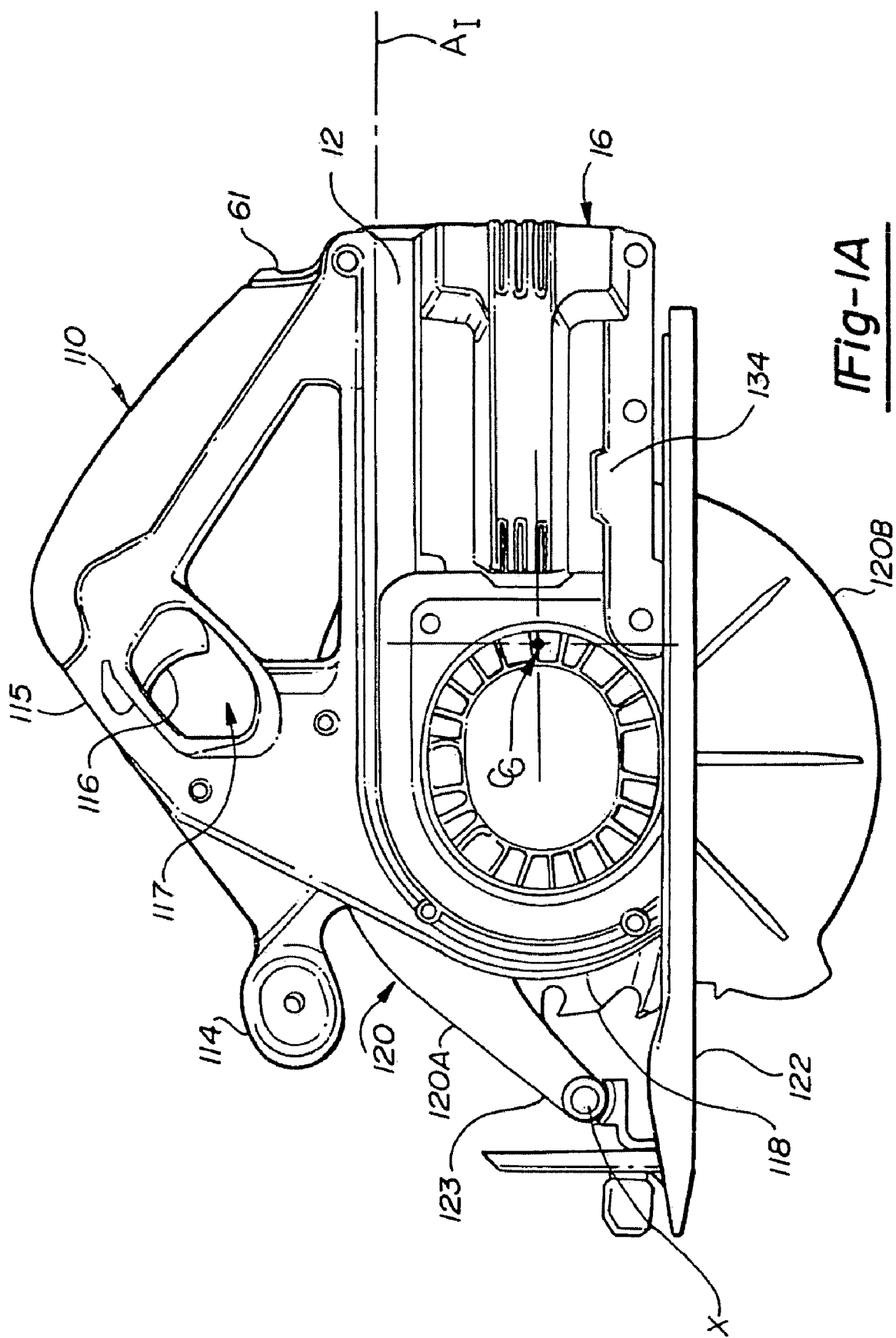
FIG. 1A is a side view of a battery powered circular saw constructed in accordance with the teachings of the present disclosure.
Figure 5:
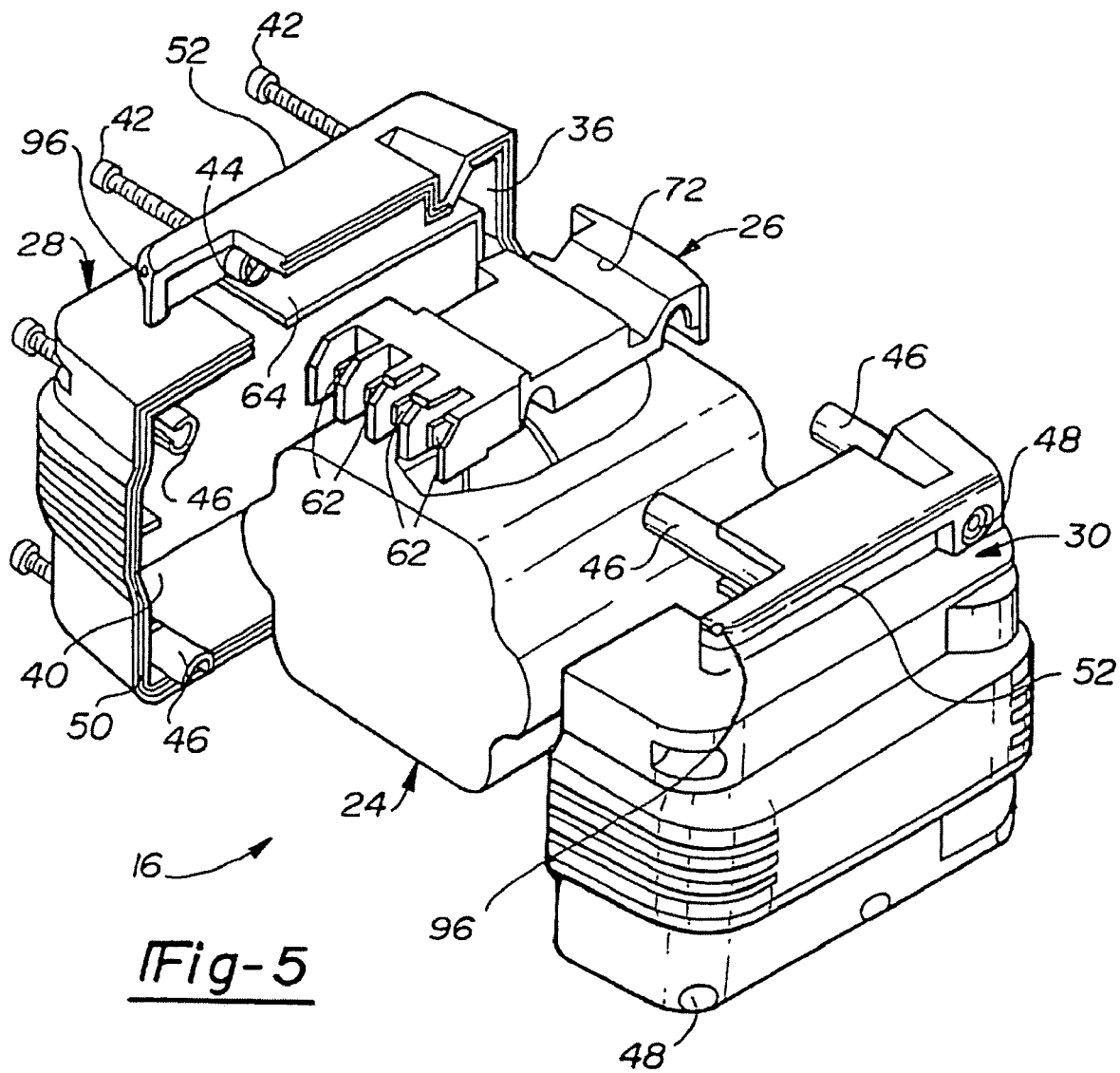
FIG. 5 is an enlarged and exploded perspective view of the rechargeable battery pack of the battery powered circular saw of the present disclosure.

Referring initially to FIGS. 1A through 3 of the drawings, a battery powered circular saw constructed in accordance with the teachings of the present disclosure is generally identified with reference numeral 10. The circular saw or tool 10 is shown to generally include a housing 12 or accommodating a motor (not shown). The tool further includes a rechargeable battery pack 16 removably attached to the housing 12 in a manner which will be discussed in detail below. Briefly, the battery pack 16 may be slidably installed to the housing 12 along an insertion axis A, and may be positioned such that the center of gravity CG of the circular saw 10 is aligned laterally (i.e., side-to-side in the present context) and/or longitudinally (i.e., fore-aft in the present context) with a trigger 116. It will become apparent below that certain aspects of the present disclosure may be applied to alternative types of battery powered tools.

One aspect of the present disclosure is particularly directed to an arrangement for locking the battery powered circular saw 10 at a desired depth of cut. Another aspect of the present disclosure is particularly directed to an arrangement for such a tool which is ergonomically improved. Before addressing these particular features of the present disclosure, an understanding of certain aspects of the exemplary tool, including the rechargeable battery pack 16 and the electrical interface between the battery pack 16 and the tool housing 12 is warranted.

With continued reference to FIGS. 1-3 and additional reference to FIGS. 5-8, the rechargeable battery pack 16 is illustrated to generally include a housing 22, a battery 24 which in the exemplary embodiment illustrated is a 24 volt nickel-cadmium battery, and a battery pack terminal block 26. The housing 22 is shown to include first and second clam shell halves 28 and 30 which are joined at a longitudinally extending centerline or parting line 32. The first and second clam shell halves 28 and 30 of the housing 22 form an upper portion 34 defining a first chamber 36 and a lower portion 38 defining a second chamber 40. The lower portion 38 includes first and second laterally spaced apart sides 41 and 43. The first chamber 36 receives the battery pack terminal block 26, while the second chamber 40 receives the battery 24. In one application, the battery pack housing 22 has an overall length of approximately 11.5 cm, an overall width of approximately 9.5 cm, and an overall height of approximately 9.5 cm.

In the exemplary embodiment, the first and second clam shell halves 28 and 30 of the housing 22 are unitarily constructed from a rigid plastic or other suitable material. The first and second clam shell halves 28 and 30 are joined by thread-forming fasteners 42. The thread-forming fasteners 42 pass through cooperating apertures 44 and screw boss portions 46 integrally formed with the clam shell halves 28 and 30. The fasteners 42 form threads in screw boss portions 46. In the exemplary embodiment illustrated, the first clam shell half 28 of the housing 22 is formed to include a peripheral groove 50 adapted to receive a mating rib (not specifically shown) peripherally extending about the second clam shell half 30.

To facilitate releasable attachment of the battery pack 16 to the tool 10, the upper portion 34 of the housing 22 is formed to include a pair of guide rails 52. The guide rails 52, which will be described further below, are slidably received into cooperating grooves 54 defined by longitudinally extending rails 55. To further facilitate removable attachment of the battery pack 16 to the tool 10, the upper portion 34 of the housing 22 defines a recess 58. The recess 58 is adapted to receive a latch pawl 59 (shown in FIG. 3) carried by the housing 12 of the tool 10. The latch pawl 59 is conventional in construction and operation and is spring biased to a downward position so as to engage the recess 58 upon insertion of the rechargeable battery pack 16. Removal of the battery pack 16 is thereby prevented until the spring bias of the latch pawl 59 is overcome through manual operation of a button 61. The button 61 functions in a conventional manner insofar as the present disclosure is concerned.

The battery pack terminal block 26 is illustrated to generally include a main body portion 60 constructed of rigid plastic or other suitable material and a plurality of terminals 62. The terminals 62 are generally planar-shaped blade terminals each oriented in a plane substantially perpendicular to a floor 64 (shown in FIG. 5) partially defining the upper chamber 36 of the housing 22. Each blade terminal 62 includes a first end 66 which downwardly extends from the main body portion 60 and is electrically connected with the battery 24 in a conventional manner. The terminals 62 further include a second end 68 which forwardly extends. In the preferred embodiment, the second ends 68 of the terminals 62 are upwardly spaced from the floor 64.

The main body 60 of the battery pack terminal block 26 is shown captured between the clam shell halves 28 and 30 of the housing 22. This arrangement improves assembly by allowing the battery pack terminal block 26 to first be electrically attached to the battery 24 and subsequently captured between the clam shell halves 28 and 30. The main body 60 is shown to include a pair of arcuate grooves 70 provided in a bottom side thereof for accommodating the screw boss portions 46 of the housing 22 upon assembly. Similarly, an upper side of the main body 60 includes a recess 72 for accommodating the portion of the housing 22 that defines the recess 58 in the housing 22. The main body portion 60 is further shown to include a plurality of insulating portions 74 interdisposed between adjacent terminals 62 and also positioned outboard of each of the outermost terminals 62.

In the exemplary embodiment illustrated, the battery pack terminal block 26 includes four blade terminals 62. Two of the blade terminals 62 are the positive and negative terminals for the battery 24. A third terminal 62 may be used to monitor temperature of the battery 24 and a fourth terminal may be used for battery identification. The particular functions of the third and fourth blade terminals 62 are beyond the scope of the present disclosure.

Figure 11:
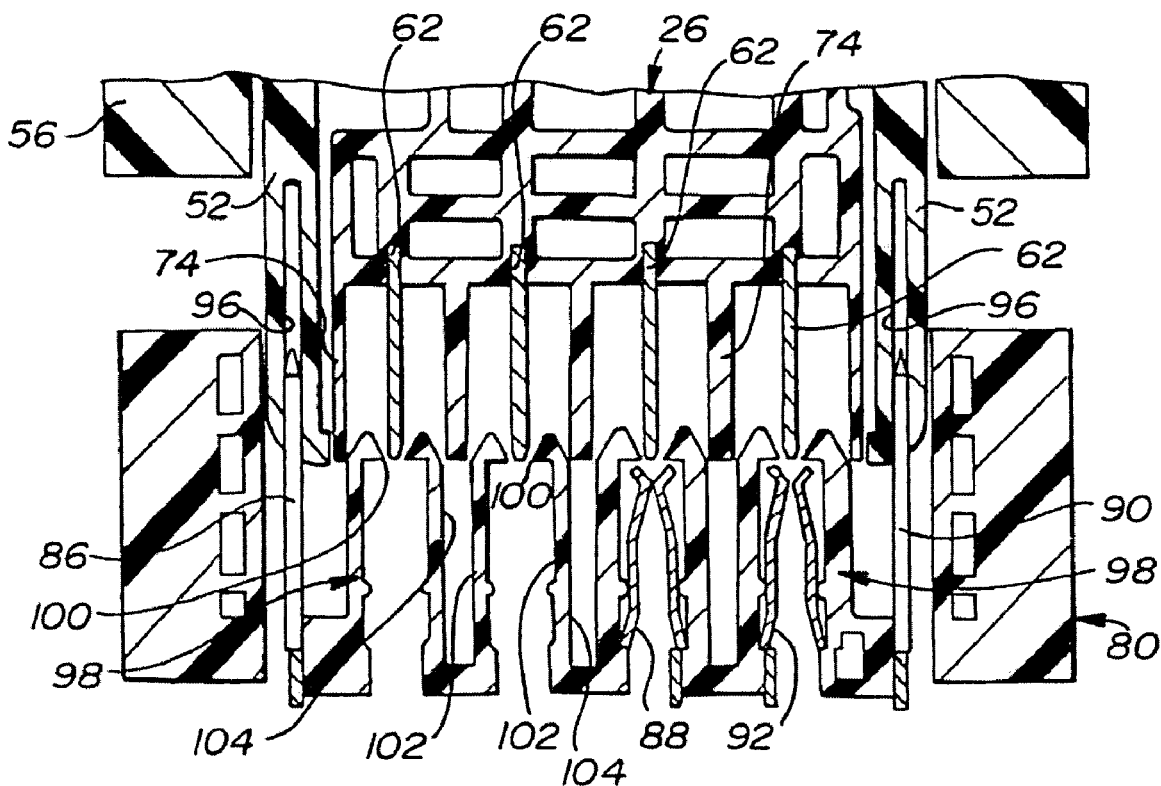
FIG. 11 is a cross-sectional view illustrating the interface between the battery pack and tool.
Figure 10:
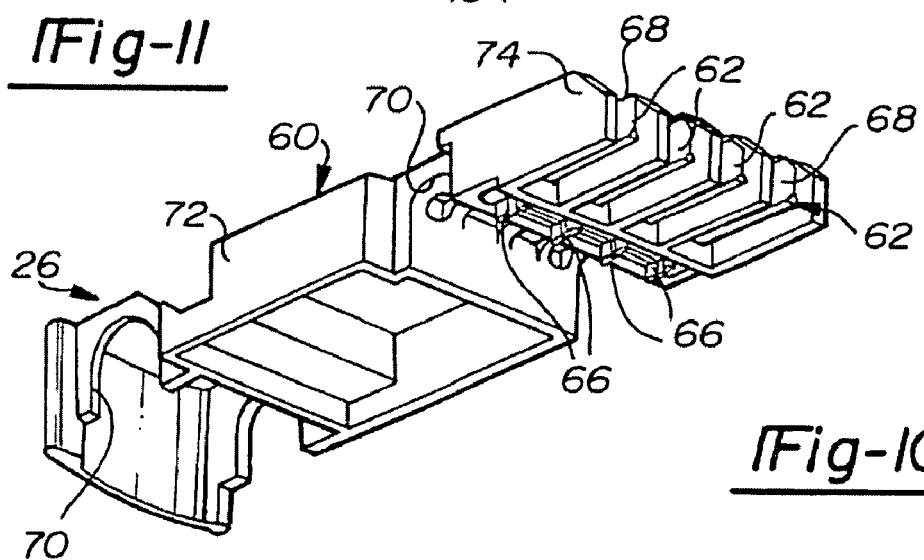
FIG. 10 is a perspective view of the battery pack terminal block of the rechargeable battery pack.

With particular reference now to FIGS. 9 and 11, a terminal block 76 carried by the tool 10 is illustrated to generally include a main body portion 80, a first or negative terminal member 82, and a second or positive terminal members 84. The first terminal member 82 includes a negative male terminal 86 and a negative female terminal 88. Similarly, the second terminal member 84 includes a positive male terminal 90 and a positive female terminal 92. As will be further discussed below, the female terminals 88 and 92 are adapted to receive the positive and negative blade terminals 62 of the battery pack terminal block 26. The male terminals 86 and 90 are adapted to electrically attach the tool 10 to a charger (not shown). As shown in FIG. 11, when the battery pack 16 is operatively attached to the tool 10, the male terminals 86 and 90 of the tool terminal block 76 are received within apertures 96 provided in each of the rails 52. It will be understood that the male terminals 86 and 90 serve no electrical function when the battery pack 16 is attached to the tool 10.

As shown particularly in the cross-sectional view of FIG. 11, the main body 80 of the tool terminal block 76 includes a plurality of window frames 98 which each define a window or opening 100 for receiving and guiding one of the blade terminals 62. The female terminals 88 and 92 of the tool terminal block 76 are disposed within adjacent ones of the window frames 98. The window frames 98 each include a pair of longitudinally extending legs 102. Openings 104 are provided between adjacent window frames 98 for receiving the insulating portions 74. The ends of each of the legs 102 of the frames 98 are generally triangular in shape so as to define lead-in surfaces for the insulating portions 74 into the openings 104 and also for the terminal blades 62 into their respective opening 100.

The battery powered circular saw 10 of the present disclosure is shown to further include a longitudinally extending handle 110 defining a longitudinal handle axis. The handle 110 includes a generally V-shaped member having a centrally located apex 111. A rear leg 112 of the handle 110 serves as a first or rear gripping portion. A second gripping portion 114 forwardly extends from a forward leg 115 of the V-shaped member. The second gripping portion 114 is generally cylindrical and is transversely aligned. The handle 110 carries a trigger 116 for actuating the motor in a conventional manner. The trigger 116 is disposed in an opening 117 adapted to receive an index finger of the tool user. In the embodiment illustrated, the handle 110 is oriented horizontally above the tool housing 12 and generally parallel to a rotatable saw blade 118. The plane in which the saw blade resides defines a direction of cut. The saw blade 118 is partially shielded by a blade guard assembly 120. The guard assembly 120 is illustrated to include a fixed or upper portion 120a and a movable or lower portion 120b.

When the battery pack 16 is completely installed, as shown in FIGS. 1A and 1B, the battery pack 16 can be substantially longitudinally positioned under the handle 110. Further, the battery pack 16 can be laterally centered under or about the handle 110 and oriented 90° with respect to a spindle axis of the tool 10. In the embodiment illustrated, the center of gravity of the tool 10, including the battery pack 16 is longitudinally and laterally aligned with the trigger 116. The handle 110 effectively bridges the weights of the motor and the battery pack 16 such that a fulcrum or balance point is established in close proximity to the trigger 116. As a result, minimal or no moment arms are presented when the tool 10 is operatively grasped by the user, thereby improving ergonomics of the tool 10.

In the embodiment illustrated, the rails 55 and the grooves 54 defined thereby are oriented parallel to the handle 110. Further, the rails 55 are provided on underside of a cantilevered portion or battery connection portion 121 of the housing 12 which rearwardly extends from a forward portion 123 and which is coupled to a rearward end of the handle 110. Releasable attachment of the battery pack 16 to the housing 12 is accomplished by first engaging the rails 52 with the grooves 54. Next, the battery pack 16 is translated relative to the housing 12 in a direction parallel to the direction of cut. Gross alignment of the battery pack terminal block 26 with the tool terminal block 76 is obtained through such sliding engagement of the rails 52 of the battery pack 16 with the grooves 54. Fine alignment of the battery pack terminal block 26 and tool terminal block 76 can be provided after the guide rails 52 have advanced substantially along the grooves 54.

The battery powered circular saw 10 is further shown to include an adjustable shoe 122 pivotally attached to a forward portion 123 of the guard assembly 120 for rotation about a pivot axis X. As will be appreciated by those of ordinary skill in the art, the shoe 122 may be adjusted for controlling the depth of cut. FIGS. 1A and 1B illustrate the battery powered circular saw 10 with the shoe 122 adjusted to a relatively deep cut. FIG. 3 illustrates the battery powered circular saw 10 adjusted to a more shallow cut.

With continued reference to FIGS. 2 and 3 and additional reference to FIG. 4, the battery powered circular saw 10 of the present disclosure is illustrated to include a locking mechanism 126 for selectively locking the adjustable shoe 122 relative to the housing 12 at a desired depth of cut. The locking mechanism 126 includes a depth of cut strap 128. The depth of cut strap 128 includes a pivoting bracket 129 at its end 130 which is secured to the adjustable shoe 122. The depth of cut strap 128 is arcuate in shape and is disposed between a first side 132 of the housing 12 and the guard assembly 120.

Fixation of the adjustable shoe 122 at a selected depth of cut is controlled by a manual lever 134 disposed adjacent a second side 136 of the housing 12. The lever 134 is carried by a through bolt 138 which passes through a boss-type portion 140 defined by the housing 12. The through bolt 138 is shown extending through an opening or free space provided between the battery 16 and a motor/gear box area or motor housing portion 139 of the tool 10. The motor housing portion 139 is employed to house a motor M having a rotational axis about which the circular saw blade 118 is rotatably disposed.

In the particular example provided, a hollow sleeve 148 is positioned between the boss portion 140 and the through bolt 138 to facilitate relative rotation and to ensure that the first side 132, and the second side 136 of the housing 12, cannot be compressed when tightening the manual lever 134. The through bolt 138 has an externally threaded shaft 141 and includes a head 142 carried at a first end 144 of the through bolt 138. A non-circular portion 146 of the through bolt 138 is slidably received within an elongated groove 148 of the strap 128 so as to prevent relative rotation. The lever 134 is fixedly attached to a nut 150, which in turn is threadably received by a second end 152 of shaft 141.

Movement of the lever 134 functions to translate the through bolt 138 toward the nut 150, thereby causing the strap 128 to be drawn against the side 132 of the housing 12. As a result, movement of the strap 128 relative to the housing 12 is arrested and the adjustable shoe 122 is thereby fixed relative to the housing 12 to establish a desired depth of cut.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A circular saw comprising:
   a housing;
   a guard coupled to the housing;
   a circular saw blade associated with the housing and laterally positioned within the guard, the circular saw blade being rotatable about a rotational axis;
   a handle with a generally V-shaped portion coupled to the housing, the generally V-shaped portion being disposed generally transverse to the rotational axis and having a first end, a second end that is positioned rearward of the first end, an apex, which is disposed above the housing between the first and second ends;
   a battery pack fixedly but releasably engaged to the housing;
   a pair of grooves formed on one of the battery pack and the housing;
   a pair of rails formed on the other one of the battery pack and the housing, the rails being configured to cooperate with the grooves to align the battery pack to the housing;
   a shoe; and
   an adjustment mechanism having a first bracket, a depth-of-cut member and a clamp, the first bracket being fixedly coupled to the shoe, the depth-of-cut member being pivotally coupled to the first bracket, the clamp including a first threaded member and a second threaded member, the first threaded member being movably coupled to the depth-of-cut member and extending through the housing, the second threaded member being threadably engaged to the first threaded member and being configured to translate the first threaded member to selectively secure the depth-of-cut member to the housing, the first threaded member being disposed between the rotational axis and an aft end of the battery pack when the battery rack is fixedly but releasably engaged to the housing, the second threaded member being disposed on a side of the housing opposite the circular saw blade;
   wherein the battery pack includes a plurality of pack terminals and a battery, the pack terminals being disposed between the rails or grooves formed on the battery pack, wherein the pack terminals are associated with a top side of the battery pack and wherein at least a majority of the battery being disposed beneath the pack terminals and the rails or grooves formed on the battery pack;
   wherein a center of gravity of the circular saw including the battery pack is located in-line with a center of the generally V-shaped portion;
   wherein a trigger is mounted in an apex of the generally V-shaped portion; and
   wherein the center of gravity is disposed in-line with the trigger in a direction that is perpendicular to both the rotational axis and a direction in which the battery pack is releasably engaged to the housing.

2. The circular saw of claim 1, wherein the first threaded member is disposed between the rotational axis and a forward end of the battery pack.

3. The circular saw of claim 2, wherein the first threaded member is disposed above a bottom surface of the battery pack when the battery pack is releasably engaged to the housing.

4. The circular saw of claim 1, wherein the first threaded member is disposed above a bottom surface of the battery pack when the battery pack is releasably engaged to the housing.

5. The circular saw of claim 1, wherein the shoe is positionable into at least one position in which at least a portion of the battery pack is disposed rearwardly of a rear side of the shoe.

6. The circular saw of claim 1, wherein the shoe is positionable in a position in which the line along which the battery pack is insertable into and removable from the battery connection portion is generally parallel to a bottom surface of the shoe.

7. The circular saw of claim 1, wherein the clamp includes a clamp lever that is rotatably mounted to the housing, the clamp lever being disposed on a side of the battery pack opposite the circular saw blade.

8. The circular saw of claim 1, wherein the battery pack is laterally centered to the handle when the battery pack is positioned in the fully inserted position.

9. The circular saw of claim 1, wherein a recess is formed in one of the battery pack and the housing and a latch is carried by the other one of the battery pack and the housing, the latch cooperating with the recess to retain the battery pack to the housing when the battery pack is positioned in the fully inserted position.

10. The circular saw of claim 9, wherein the latch includes a latch release and a latch member, the latch member being received into the latch recess when the battery pack is positioned in the fully inserted position, the latch release being operable for selectively retracting the latch member to permit the battery pack to be removed from the housing.

11. The circular saw of claim 9, wherein the recess is formed in a top surface of the battery pack.

12. The circular saw of claim 1, wherein the tool terminal block includes a plurality of tool terminals and the battery terminal block includes a plurality of pack terminals, at least a portion of the pack terminals engaging the tool terminals when the battery pack is positioned in the fully inserted position.

13. The circular saw of claim 12, wherein one of the tool terminals and the pack terminals is a male spade terminal and the other one of the tool terminals and the pack terminals is a female terminal into which an associated one of the male spade terminals is slidingly received.

14. The circular saw of claim 12, wherein the battery pack includes a first keying feature and the housing includes a second keying feature, the first and second keying features cooperating to align the pack terminals and the tool terminals when the battery pack is moved to the fully inserted position.

15. The circular saw of claim 14, wherein the first keying feature is disposed between two of the pack terminals.

16. The circular saw of claim 14, wherein one of the first and second keying features is a tab.

17. The circular saw of claim 16, wherein the other one of the first and second keying features is an opening.

18. A circular saw comprising:
a housing;
a circular saw blade associated with the housing and rotatable about a rotational axis;
a handle with a generally V-shaped portion coupled to the housing, the generally V-shaped portion being disposed generally transverse to the rotational axis and having a first end, a second end that is positioned rearward of the first end, an apex, which is disposed above the housing between the first and second ends;
a battery pack fixedly but releasably engaged to the housing;
a pair of grooves formed on one of the battery pack and the housing;
a pair of rails formed on the other one of the battery pack and the housing, the rails being configured to cooperate with the grooves to align the battery pack to the housing such that a center of the battery pack is laterally aligned to a center of the generally V-shaped portion;
a shoe; and
an adjustment mechanism having a first bracket, a depth-of-cut member and a clamp, the first bracket being fixedly coupled to the shoe, the depth-of-cut member being pivotally coupled to the first bracket and having an arcuate groove formed therein, the clamp including a first threaded member and a second threaded member, the first threaded member having a non-circular portion that is disposed in the arcuate groove of the depth-of-cut member, the first threaded member extending through the housing, the second threaded member being threadably engaged to the first threaded member and being configured to translate the first threaded member relative to the housing to selectively secure the depth-of-cut member to the housing, the first threaded member being disposed between the rotational axis and an aft end of the battery pack when the battery pack is fixedly but releasably engaged to the housing, the second threaded member being disposed on a side of the housing opposite the circular saw blade;
wherein a center of gravity of the circular saw including the battery pack is located in-line with a center of the generally V-shaped portion, wherein a trigger is mounted in an apex of the generally V-shaped portion and wherein the center of gravity is disposed in-line with the trigger in a direction that is perpendicular to both the rotational axis and a direction in which the battery pack is releasably engaged to the housing.

19. A circular saw comprising:
a housing;
a guard coupled to the housing;
a circular saw blade associated with the housing and laterally positioned within the guard, the circular saw blade being rotatable about a rotational axis;
a handle with a generally V-shaped portion coupled to the housing, the generally V-shaped portion being disposed generally transverse to the rotational axis and having a first end, a second end that is positioned rearward of the first end, an apex, which is disposed above the housing between the first and second ends;
a battery pack fixedly but releasably engaged to the housing;
a pair of grooves formed on one of the battery pack and the housing;
a pair of rails formed on the other one of the battery pack and the housing, the rails being configured to cooperate with the grooves to align the battery pack to the housing;
a shoe; and
an adjustment mechanism having a first bracket, a depth-of-cut member and a clamp, the first bracket being fixedly coupled to the shoe, the depth-of-cut member being pivotally coupled to the first bracket, the clamp including a first threaded member and a second threaded member, the first threaded member being movably coupled to the depth-of-cut member and extending through the housing, the second threaded member being threadably engaged to the first threaded member and being configured to translate the first threaded member to selectively secure the depth-of-cut member to the housing, the first threaded member being disposed between the rotational axis and an aft end of the battery pack when the battery pack is fixedly but releasably engaged to the housing, the second threaded member being disposed on a side of the housing opposite the circular saw blade;
wherein the battery pack includes a plurality of pack terminals and a battery, the pack terminals being disposed between the rails or grooves formed on the battery pack, wherein the pack terminals are associated with a top side of the battery pack and wherein at least a majority of the battery being disposed beneath the pack terminals and the rails or grooves formed on the battery pack;

wherein a center of gravity of the circular saw including the battery pack is located in-line with a center of the generally V-shaped portion;

wherein a trigger is mounted in an apex of the generally V-shaped portion; and wherein the center of gravity is disposed in-line with the trigger in a direction that is perpendicular to both the rotational axis and a direction in which the battery pack is releasably engaged to the housing;

wherein the first threaded member is disposed between the rotational axis and a forward end of the battery pack;

wherein the first threaded member is disposed above a bottom surface of the battery pack when the battery pack is releasably engaged to the housing; and wherein the first threaded member is disposed above a bottom surface of the battery pack when the battery pack is releasably engaged to the housing.

20. A circular saw comprising:

a housing;

a guard coupled to the housing;

a circular saw blade associated with the housing and laterally positioned within the guard, the circular saw blade being rotatable about a rotational axis;

a handle with a generally V-shaped portion coupled to the housing, the generally V-shaped portion being disposed generally transverse to the rotational axis and having a first end, a second end that is positioned rearward of the first end, an apex, which is disposed above the housing between the first and second ends;

a battery pack fixedly but releasably engaged to the housing;

a pair of grooves formed on one of the battery pack and the housing;

a pair of rails formed on the other one of the battery pack and the housing, the rails being configured to cooperate with the grooves to align the battery pack to the housing;

a shoe; and an adjustment mechanism having a first bracket, a depth-of-cut member and a clamp, the first bracket being fixedly coupled to the shoe, the depth-of-cut member being pivotally coupled to the first bracket, the clamp including a first threaded member and a second threaded member, the first threaded member being movably coupled to the depth-of-cut member and extending through the housing, the second threaded member being threadably engaged to the first threaded member and being configured to translate the first threaded member to selectively secure the depth-of-cut member to the housing, the first threaded member being disposed between the rotational axis and an aft end of the battery pack when the battery pack is fixedly but releasably engaged to the housing, the second threaded member being disposed on a side of the housing opposite the circular saw blade;

wherein a center of gravity of the circular saw including the battery pack is located in-line with a center of the generally V-shaped portion;

wherein a trigger is mounted in an apex of the generally V-shaped portion; and wherein the center of gravity is disposed in-line with the trigger in a direction that is perpendicular to both the rotational axis and a direction in which the battery pack is releasably engaged to the housing.

21. The circular saw of claim 14, wherein the second keying feature is disposed between two of the tool terminals.

* * * * *